3,255,150
POLYACETALS CONTAINING A DITHIOOXAMIDE AND OPTIONALLY A BISPHENOL AND A THIO-DIALKANOIC ACID DIESTER AS STABILIZERS
Richard Green, Livingston, N.J., assignor, by mesne assignments, to Tenneco Chemicals, Inc., a corporation of Delaware
No Drawing. Filed Apr. 5, 1963, Ser. No. 270,815
13 Claims. (Cl. 260—45.8)

This invention relates to the stabilization of polyacetals and, more particularly, to the stabilization of high molecular weight polymers of formaldehyde. The invention provides an improved thermally stable polyacetal composition and is based upon the discovery that certain N,N'-disubstituted dithiooxamides, when incorporated into a high molecular weight polymer of formaldehyde, particularly in conjunction with other stabilizers, are remarkably effective for improving the thermal stability of the formaldehyde polymer.

Recent advances in polymer process technology have made commercially available the high molecular weight polymers of formaldehyde. These polyacetals, which include both the homopolymers and copolymers of formaldehyde, are thermoplastic resins which, upon stabilization, may be fabricated into films, filaments, fibers, rods and tubes. Because of the inherent instability of unstabilized polyacetals (such as polyoxymethylene glycol) to oxidative or hydrolytic cleavage of the polymer chains or to thermal degradation, generally the raw "uncapped" polymers require stabilization, either by the further reaction of an "uncapped" polymer by acylation, etherification, cyanoethylation, or cross-linking to block the "uncapped" hydroxy groups, by controlled degradation of the polymer chain until an end-group is reached which is inert to further chemical or physical degradation, by the incorporation in the polymer composition of a stabilizer or stabilizer systems which promote the stabilization of the polymer against oxidative, hydrolytic or thermal degradation, or by employing a combination of these techniques.

Using a large number of high molecular weight polymers of formaldehyde, including both linear and branched-chain homopolymers and copolymers as well as the "capped" and "uncapped" analogs of these polymers, I have found in all instances that the incorporation (or admixture) in the formaldehyde polymer of an N,N'-disubstituted dithiooxamide is remarkably effective for improving the thermal stability of the formaldehyde polymer. Moreover, when the N,N'-disubstituted dithiooxamide is employed in the formaldehyde polymer in conjunction with other stabilizers, such as phenolic antioxidants and thiodialkanoic acid diesters, then the thermal stability of resultant polyacetal compositions is much greater than can be obtained when any of these stabilizers is employed by itself. Based on the results of an extensive series of experiments, it appears that stabilizer systems containing N,N'-disubstituted dithiooxamides may be used to stabilize any polyacetal composition containing a high molecular weight polymer of formaldehyde.

As used herein, the term "high molecular weight polymer of formaldehyde" includes both linear and branched-chain homopolymers and copolymers of formaldehyde having a molecular weight in the range from about 10,000 to about 200,000 and a melting point in excess of 170° C., the predominant structural feature of both homopolymers and copolymers being the recurring oxymethylene units (—OCH$_2$—) in the polymer chain. Among the most important homopolymers are α,ω-polyoxymethylene glycol, α,ω-polyoxymethylene dicarboxylates (such as the diacetate or dipropionate), and α,ω-polyoxymethylene diethers (such as the methyl, ethyl, or β-hydroxyethyl ethers), all of which may have ω-substituted polyoxymethylene branched chains at one or more points in the main polymer chain. The formaldehyde copolymers include both linear and branched-chain polymers in which the recurring oxymethylene units (—OCH$_2$—) in the polymer chains are periodically or randomly interrupted by other oxyalkylene units containing two or more vicinal carbon atoms, or by other units introduced by copolymerizing other monomers, such as γ-butyrolactone, phthalide or isocyanic acid, with substantially anhydrous formaldehyde or with its trimer, trioxane.

The N,N'-disubstituted dithiooxamides which are used to stabilize high molecular weight polymers of formaldehyde in accordance with the invention are structurally represented by the formula

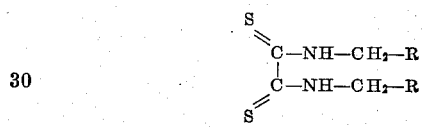

in which R represents a radical selected from the group consisting of hydroxyalkyl groups having from 1 to 4 carbon atoms and from 1 to 4 hydroxy groups, heterocyclic groups, and toluidinomethylene groups. Among the N,N'-disubstituted dithiooxamides which have been successfully used to stabilize formaldehyde polymers are N,N'-di-(2-hydroxyethyl) dithiooxamide, N,N'-di-(3-hydroxypropyl) dithiooxamide, N,N'-diglucityl dithiooxamide, N,N'-difurfuryl dithiooxamide, N,N'-di-(2-pyridylmethyl) dithiooxamide, N,N'-di-(3-pyridylmethyl) dithiooxamide, N,N'-di-(m-toluidinoethyl) dithiooxamide, and N,N'-di-[2-(N''-ethyl-m-toluidino)-ethyl] dithiooxamide. The stabilizing activity of these N,N'-disubstituted dithiooxamides is surprising inasmuch as dithiooxamide and such derivatives as N,N'-dialkyldithiooxamides, N,N'-dicyclohexyl dithiooxamide, and N,N'-dibenzyl dithiooxamide have a degrading rather than a stabilizing effect on polyacetyl compositions.

Only very small amounts of these effective N,N'-disubstituted dithiooxamides are required to stabilize the formaldehyde polymer, for concentrations as low as 0.01 percent by weight (based on the weight of the formaldehyde polymer) have been found to be effective. There appears to be no useful advantage in using more than about 30 percent by weight of the N,N'-disubstituted dithiooxamides, and in general concentrations in the range of from about 0.01 to about 20 percent by weight, based on the weight of the formaldehyde polymer, are sufficient to stabilize most high molecular weight polymers of formaldehyde.

Accordingly, the invention provides an improved thermally stable polyacetal composition comprising a high molecular weight polymer of formaldehyde having a molecular weight in the range from about 10,000 to about 200,000 and a melting point in excess of 170° C. and containing a stabilizer system comprising from about 0.01 to about 30 percent by weight, based on the weight of the formaldehyde polymer in the polyacetal composition, of an N,N'-disubstituted dithiooxamide having a structure represented by the formula

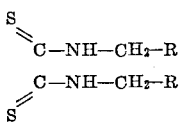

in which R° and R' represent each an alkyl group having consisting of hydroxyalkyl groups having from 1 to 4 carbon atoms and from 1 to 4 hydroxy groups, heterocyclic groups, and toluidinomethylene groups.

By themselves, these N,N'-disubstituted dithiooxamides exert a marked stabilizing effect on any high molecular weight polymer of formaldehyde, but their effectiveness is even more pronounced when they are used in a stabilizer system which also contains a phenolic antioxidant and a thiodialkanoic acid diester. These phenolic antioxidants are structurally represented by the formula

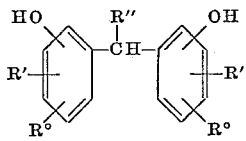

in which R° and R' each represents an alkyl group having from 1 to 4 carbon atoms, and R'' represents a radical selected from the group consisting of hydrogen, and alkyl groups having from 1 to 3 carbon atoms. Among the many phenolic antioxidants which may be used in a stabilizer system together with the N,N'-disubstituted dithiooxamides in accordance with the invention are 2,2'-methylene-bis-(4-methyl-6-t-butylphenol), 6,6'-methylene-bis-(3,4 - xylenol), 2,2' - methylene - bis - (4-ethyl-6-t-butylphenol), 4,4'-methylene-bis-(2,6-di-t-butylphenol), 6,6'-ethylidene - bis - (2,4-xylenol), 4,4' - ethylidene-bis-(2,5-xylenol), 2,2' - ethylidene-bis-(4-methyl-6-t-butylphenol), 6,6' - propylidene - bis-(2,4-xylenol), 4,4'-butylidene-bis-(3-methyl-6-t-butylphenol), 6,6'-butylidene-bis - (2,4-xylenol), 2,2' - butylidene - bis - (4-t-butyl-6-methylphenol), 6,6'-butylidene-bis-(2,4-xylenol), and 4,4'-butylidene-bis-(2,5-xylenol). Although the phenolic antioxidant may be used over a wide range of concentrations, generally in the range from about 0.01 to about 10 percent by weight (based on the weight of the formaldehyde polymer), I have obtained particularly satisfactory results using stabilizer systems which contained the phenolic antioxidant in concentrations equivalent to from about 0.01 to about 1 percent by weight, based on the weight of the formaldehyde polymer.

In addition to phenolic antioxidants, the N,N'-disubstituted dithiooxamides may be used in stabilizer systems containing a diester of a thiodialkanoic acid. Structurally, these diesters are represented by the formula

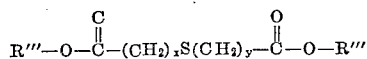

in which R''' is a radical selected from the group consisting of alkyl groups having from 8 to 20 carbon atoms, hydroxyalkyl groups having from 1 to 4 carbon atoms, cycloalkyl groups, and polyoxyalkyl groups, and $x$ and $y$ each represent an integer from 1 to 3. Diesters which may be used in the stabilizer system include, by way of illustration, dioctyl 2,2'-thiodiacetate, dilauryl 2,2'-thiodiacetate, dioctyl 3,3'-thiodipropionate, didecyl 3,3'-thiodipropionate, dicetyl 3,3'-thiodipropionate, distearyl 3,3'-thiodipropionate, dieicosyl 3,3'-thiodipropionate, lauryl stearyl 3,3'-thiodipropionate, dicyclohexyl 3,3'-thiodipropionate, di-(4-ethylcyclohexyl) 3,3'-thiodipropionate, di-(hydroxymethyl) 3,3'-thiodipropionate, di-(hydroxybutyl) 3,3'-thiodipropionate, di-(polyethylene glycol) 3,3'- thiodipropionate, dilauryl 4,4'-thiodibutyrate, dicyclohexyl 4,4'-thiodibutyrate, and di-(hydroxyethyl) 4,4'-thiobutyrate, the preferred diesters being those in which R represents an alkyl group having from 12 to 18 carbon atoms, and $x$ and $y$ are 2. The amount of the thiodialkanoic acid diester used in the stabilizer system need only be equivalent to from about 0.0001 to about 1 percent by weight, and in most instances to from about 0.001 to about 0.8 percent by weight, based on the weight of the formaldehyde polymer, since the thiodialkanoic acid diester appears in some way to enhance the effectiveness of the other additives in the stabilizer system.

Although the optimum concentration ranges which are described above for each of the components of the stabilizer system have been found to be effective for enhancing the thermal stability of those high molecular weight polymers of formaldehyde which were tested, it should be realized that the actual amount of each stabilizer used in the stabilizer system is dependent, to a large extent, upon the structure and chemical composition of the formaldehyde polymer. For example, if the formaldehyde polymer also has been chemically stabilized, such as by acylation, etherification or cross-linking to block the "uncapped" hydroxy groups, then a lower concentration of the stabilizer system may be used. Notwithstanding the degree of chemical stabilization in the formaldehyde polymer, however, by using these ternary stabilizer systems, that is, systems which contain at least one of each of the three aforementioned components, in high molecular weight polymers of formaldehyde, it is possible to improve the thermal stability of the resultant polyacetal composition.

The stabilizers may be incorporated in the polyacetal compositions of the invention by any convenient procedure, one method for which involves dissolving the stabilizer components in a volatile solvent, such as a ketone, lower alkanol, or chlorinated hydrocarbon, adding to the formaldehyde polymer such amounts of these solutions (or a single solution of all three components) which are sufficient to provide the desired amounts of the stabilizer components in the polyacetal composition, and removing the solvent by evaporation. Alternatively, the stabilized polyacetal compositions of the invention can be prepared by milling the stabilizer components together with the formaldehyde polymer, or by dissolving both the stabilizer components and the formaldehyde polymer in a common solvent and then removing the solvent by evaporation.

The following examples are illustrative of the effectiveness with which N,N'-disubstituted dithiooxamides may be incorporated into high molecular weight polymers of formaldehyde, either by themselves or in stabilizer systems containing other additives, to prepare the thermally stable polyacetal compositions of the invention:

EXAMPLE I

A series of ten stabilized polyacetal compositions was prepared by the following procedure: To one part by weight of polyoxymethylene diacetate (the term "polyoxymethylene diacetate" being used to define an acetylated homopolymer of formaldehyde, which may have been branched and hence contained more than 2 acetate groups per molecule), having varying average molecular weights, as determined by viscometric techniques, was added two parts by weight of a 1 percent solution in acetone of one of four different N,N'-disubstituted dithiooxamides. The compositions were air-dried to remove the solvent, and the thermal stability rating for each composition was determined by measuring the weight loss that the stabilized and unstabilized polyacetal compositions underwent on heating in an oxidizing atmosphere for 30 minutes at 222° C. The test results which were obtained on each of these ten polyacetal compositions are set forth below in Table I.

were heated in an oxidizing atmosphere for 30 minutes at 222° C.

*Table I*

THERMAL STABILITY RATINGS OF POLYACETAL COMPOSITIONS

| Ex. No. | Polyoxymethylene Diacetate | | Stabilizer | Percent Loss in Weight of Stabilized Polymer |
|---|---|---|---|---|
| | Mol. Wt. | Percent Loss in Weight of Unstabilized Polymer | | |
| 1A | 30,000 | 36.8 | N,N'-Di-(2-hydroxyethyl) dithiooxamide | 6.5 |
| 1B | 45,000 | 23.8 | ----do---- | 4.8 |
| 1C | 24,000 | 15.4 | N,N'-Diglucityl dithiooxamide | 6.7 |
| 1D | 20,000 | 26.0 | ----do---- | 7.7 |
| 1E | 15,000 | 30.3 | ----do---- | 15.4 |
| 1F | 20,000 | 26.0 | N,N'-Di-[2-(N'''-ethyl-m-toluidino)-ethyl] dithiooxamide | 15.6 |
| 1G | 15,000 | 30.3 | ----do---- | 10.4 |
| 1H | 24,000 | 15.4 | N,N'-Difurfuryl dithiooxamide | 10.9 |
| 1I | 20,000 | 26.0 | ----do---- | 6.7 |
| 1J | 15,000 | 30.3 | ----do---- | 6.6 |

EXAMPLE II

A series of six stabilized polyacetal compositions was prepared by the following procedure: To one part by weight of polyoxymethylene diacetate (the term "polyoxymethylene diacetate" being used to define an acetylated homopolymer of formaldehyde, which may have been branched and hence contained more than 2 acetate groups per molecule), having varying average molecular weights, as determined by viscosmetric techniques, was added 1.5 part by weight of a 1 percent solution in acetone of an N,N'-disubstituted dithiooxamide (either N,N'-difurfuryl dithiooxamide or N,N'-diglucityl dithiooxamide), 0.3 part by weight of a 1 percent solution in acetone of 4,4'-butylidene-bis-(3-methyl-6-t-butylphenol), and 0.1 part by weight of a 1 percent solution in acetone of dilauryl 3,3'-thiodipropionate. The resulting mixtures were air-dried to remove the acetone, and the thermal stability rating for each composition was determined by measuring the weight loss that the stabilized and unstabilized polyacetal composition underwent on heating in an oxidizing atmosphere for 30 minutes at 222° C. The results of these tests are summarized in Table II.

*Table II*

THERMAL STABILITY RATINGS OF POLYACETAL COMPOSITIONS CONTAINING A TERNARY STABILIZER SYSTEM

| Ex. No. | Polyoxymethylene Diacetate | | N,N'-disubstituted Dithiooxamide | Percent Loss in Weight of Stabilized Polymer |
|---|---|---|---|---|
| | Mol. Wt. | Percent Loss in Weight of Unstabilized Polymer | | |
| 2A | >200,000 | 23.1 | N,N'-Difurfuryl dithiooxamide | 8.9 |
| 2B | 110,000 | 39.4 | ----do---- | 4.0 |
| 2C | 100,000 | 15.2 | ----do---- | 5.5 |
| 2D | >200,000 | 23.1 | N,N'-Diglucityl dithiooxamide | 12.4 |
| 2E | 110,000 | 39.4 | ----do---- | 5.0 |
| 2F | 100,000 | 15.2 | ----do---- | 8.2 |

EXAMPLE III

To compare the relative stabilizing effect exerted on a polyacetal composition by N,N'-disubstituted dithiooxamides which do not fall within the scope of the invention, Table III sets forth the results which were obtained when seven polyacetal compositions (polyoxymethylene diacetate) which contained either no stabilizer, or 2 percent by weight of a dithiooxamide in which the N-substituent is not one of the radicals previously defined,

*Table III*

THERMAL STABILITY RATINGS OF POLYACETAL COMPOSITIONS

| Ex. No. | Stabilizer | Percent Loss in Weight of Polymer |
|---|---|---|
| 3A | Dithiooxamide | 25.8 |
| 3B | N,N'-Dimethyl dithiooxamide | 22.3 |
| 3C | N,N'-Didodecyl dithiooxamide | 31.5 |
| 3D | N,N'-Dicyclohexyl dithiooxamide | 28.2 |
| 3E | N,N'-Dibenzyl dithiooxamide | 38.1 |
| 3F | N,N'-Carboxymethyl dithiooxamide | 48.9 |
| 3G | None | 13.4 |

Comparison of the data set forth in Table III shows that dithiooxamide, as well as its dimethyl, didodecyl, dicyclohexyl, dibenzyl and dicarboxymethyl analogs, actually promote rather than retard thermal degradation of the formaldehyde polymer. These results are in marked contrast to the thermal stabilization effect exerted on a polyacetal composition by the N,N'-disubstituted dithiooxamides listed in Tables I and II.

I claim:
1. A thermally stable polyacetal composition comprising a high molecular weight polymer of formaldehyde having a molecular weight in the range from about 10,000 to about 200,000 and a melting point in excess of 170° C. and containing a stabilizer system comprising from about 0.01 to about 30 percent by weight, based on the weight of the formaldehyde polymer in the polyacetal composition, of an N,N'-disubstituted dithio- oxamide having a structure represented by the formula

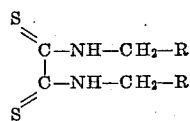

in which R represents a radical selected from the group consisting of hydroxyalkyl groups having from 1 to 4 carbon atoms and from 1 to 4 hydroxy groups, heterocyclic groups, and toluidinomethylene groups.

2. A thermally stable polyacetal composition comprising a high molecular weight polymer of formaldehyde having a molecular weight in the range from about 10,000 to about 200,000 and a melting point in excess of 170° C. and containing from about 0.01 to about 30 percent by weight, based on the weight of the formaldehyde polymer, of N,N'-di-(2-hydroxyethyl) dithiooxamide.

3. A thermally stable polyacetal composition comprising a high molecular weight polymer of formaldehyde having a molecular weight in the range from about 10,000 to about 200,000 and a melting point in excess of 170° C. and containing from about 0.01 to about 30 percent by weight, based on the weight of the formaldehyde polymer, of N,N'-diglucityl dithiooxamide.

4. A thermally stable polyacetal composition comprising a high molecular weight polymer of formaldehyde having a molecular weight in the range from about 10,000 to about 200,000 and a melting point in excess of 170° C. and containing from about 0.01 to about 30 percent by weight, based on the weight of the formaldehyde polymer of N,N'-di-[2-(N''-ethyl-m-toluidino)-ethyl] dithiooxamide.

5. A thermally stable polyacetal composition comprising a high molecular weight polymer of formaldehyde having a molecular weight in the range from about 10,000 to about 200,000 and a melting point in excess of 170° C. and containing from about 0.01 to about 30 percent by weight, based on the weight of the formaldehyde polymer, of N,N'-difurfuryl dithiooxamide.

6. A thermally stable polyacetal composition comprising a high molecular weight polymer of formaldehyde having a molecular weight in the range from about 15,000 to about 100,000 and a melting point in excess of 170° C. and containing a stabilizer system comprising (i) from about 0.01 to about 20 percent by weight of an N,N'-disubstituted dithiooxamide having a structure represented by the formula

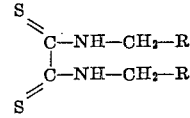

in which R represents a radical selected from the group consisting of hydroxyalkyl groups having from 1 to 4 carbon atoms and from 1 to 4 hydroxy groups, heterocyclic groups, and toluidinomethylene groups, (ii) from about 0.001 to about 10 percent by weight of a phenolic antioxidant having a structure represented by the formula

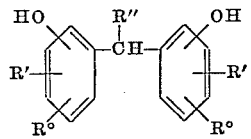

in which $R°$ and $R'$ each represent an alkyl group having from 1 to 40 carbon atoms, and $R''$ represents a radical selected from the group consisting of hydrogen, and alkyl groups having from 1 to 3 carbon atoms, and (iii) from about 0.0001 to about 1 percent by weight of a diester of a thiodialkanoic acid having a structure represented by the formula

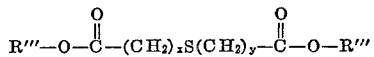

in which $R'''$ is a radical selected from the group consisting of alkyl groups having from 8 to 20 carbon atoms, cyclo-alkyl groups, hydroxyalkyl groups having from 1 to 4 carbon atoms, and polyoxyalkyl groups, and $x$ and $y$ each represent an integer from 1 to 3, all percentages being based on the weight of the formaldehyde polymer in the polyacetal composition.

7. A thermally stable polyacetal composition comprising a high molecular weight polymer of formaldehyde having a molecular weight in the range from about 15,000 to about 100,000 and a melting point in excess of 170° C. and containing a stabilizer system comprising (i) from about 0.05 to about 20 percent by weight of an N,N'-disubstituted dithiooxamide having a structure represented by the formula

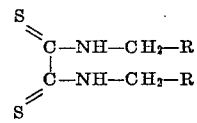

in which R represents a radical selected from the group consisting of hydroxyalkyl groups having from 1 to 4 carbon atoms and from 1 to 4 hydroxy groups, heterocyclic groups, and toluidinomethylene groups, (ii) from about 0.01 to about 1 percent by weight of a phenolic antioxidant having a structure represented by the formula

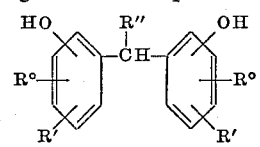

in which $R°$ and $R'$ each represent an alkyl group having from 1 to 4 carbon atoms, and $R''$ represents a radical selected from the group consisting of hydrogen, and alkyl groups having from 1 to 3 carbon atoms, and (iii) from about 0.001 to about 0.8 percent by weight of a diester of a thiodialkanoic acid having a structure represented by the formula

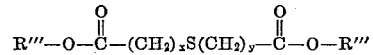

in which $R'''$ is a radical selected from the group consisting of alkyl groups having from 8 to 20 carbon atoms, cycloalkyl groups, hydroxyalkyl groups having from 1 to 4 carbon atoms, and polyoxyalkyl groups, and $x$ and $y$ each represent an integer from 1 to 3, all percentages being based on the weight of the formaldehyde polymer in the polyacetal composition.

8. A polyacetal composition according to claim 7, in which the N,N'-disubstituted dithiooxamide is N,N'-di-(2-hydroxyethyl) dithiooxamide.

9. A polyacetal composition according to claim 7, in which the N,N'-disubstituted dithiooxamide is N,N'-diglucityl dithiooxamide.

10. A polyacetal composition according to claim 7, in which the N,N'-disubstituted dithiooxamide is N,N'-di-[2-(N''-ethyl-m-toluidino)-ethyl] dithiooxamide.

11. A polyacetal composition according to claim 7, in which the N,N'-disubstituted dithiooxamide is N,N'-difurfuryl dithiooxamide.

12. A polyacetal composition according to claim 7, in which the phenolic antioxidant is 4,4-butylidene-bis-(3-methyl-6-t-butylphenol).

13. A polyacetal composition according to claim 7, in which the thiodialkanoic acid diester is dilauryl thiodipropionate.

References Cited by the Examiner

FOREIGN PATENTS 611,139 6/1962 Belgium.
927,977 6/1963 Great Britain.

LEON J. BERCOVITZ, *Primary Examiner.*

G. W. RAUCHFUSS, Jr., *Assistan Examiner.*

UNITED STATES PATENT OFFICE
CERTIFICATE OF CORRECTION

Patent No. 3,255,150                                        June 7, 1966

Richard Green

It is hereby certified that error appears in the above numbered patent requiring correction and that the said Letters Patent should read as corrected below.

Column 3, lines 10 to 15, the formula should appear as shown below instead of as in the patent:

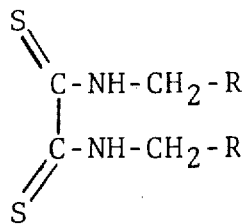

same column 3, line 16, for "in which R° and R′ represent each an alkyl group having" read -- in which R represents a radical selected from the group --; same column 3, lines 63 to 65, the formula should appear as shown below instead of as in the patent:

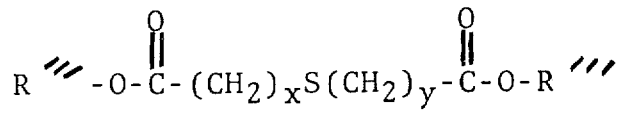

column 4, line 1, for ",3′-" read -- 3,3′- --; column 7, line 66 for "40" read -- 4 --.

Signed and sealed this 1st day of August 1967.

(SEAL)
Attest:

EDWARD M. FLETCHER, JR.                            EDWARD J. BRENNER
Attesting Officer                                    Commissioner of Patents